Jan. 16, 1934.  B. O. GODFREY  1,943,862
DIRECT READING PITCHOMETER
Filed March 13, 1931   4 Sheets-Sheet 3
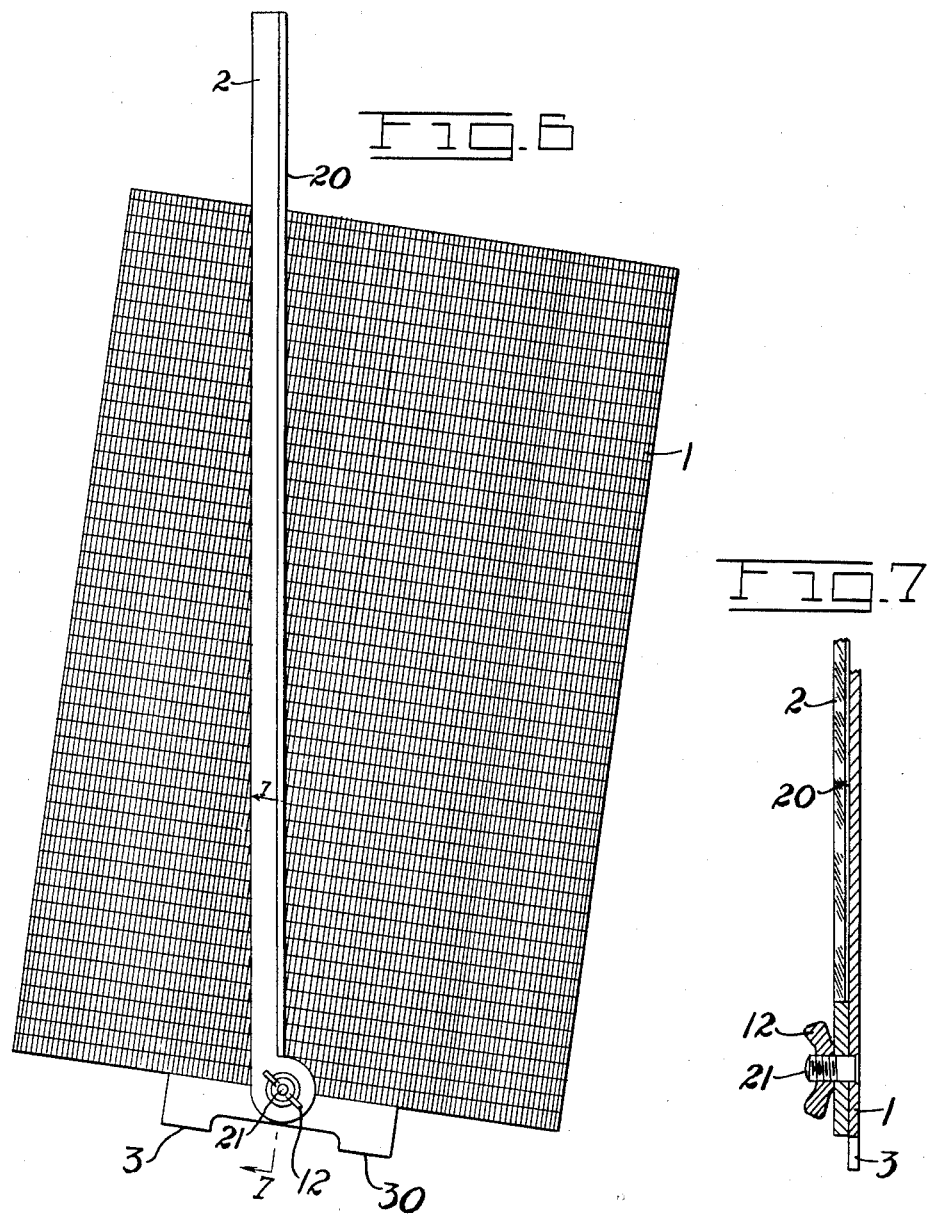
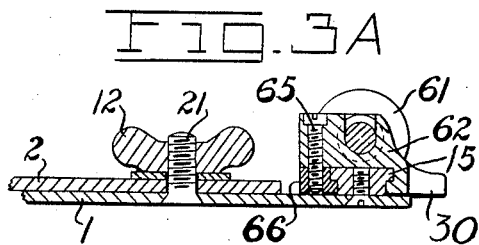
Inventor
*Bert O. Godfrey*
By *Charles L. Reynolds*
Attorney Jan. 16, 1934.  B. O. GODFREY  1,943,862
DIRECT READING PITCHOMETER
Filed March 13, 1931  4 Sheets-Sheet 4
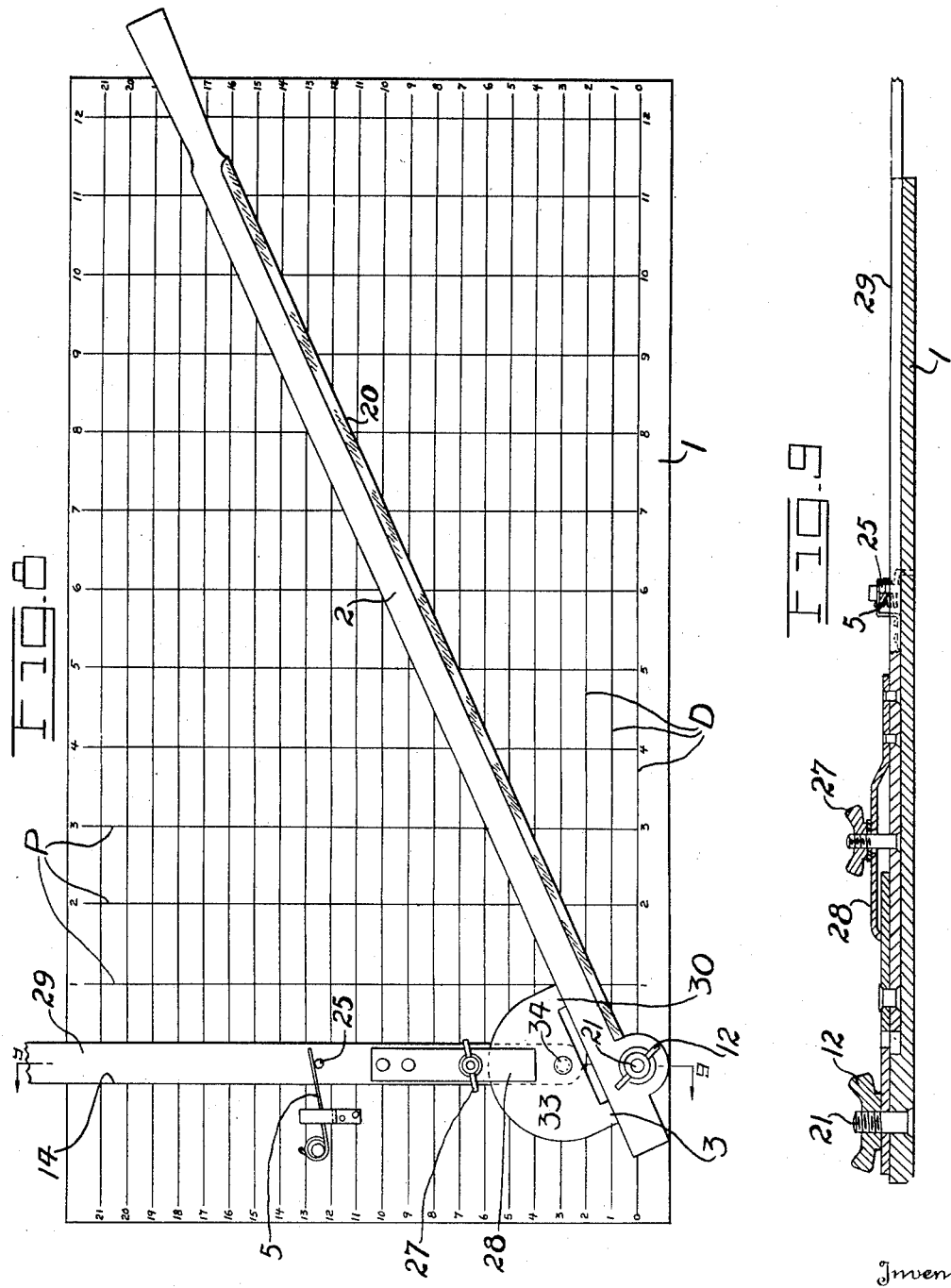
Inventor
Bert O. Godfrey
By Charles L. Reynolds
Attorney Patented Jan. 16, 1934

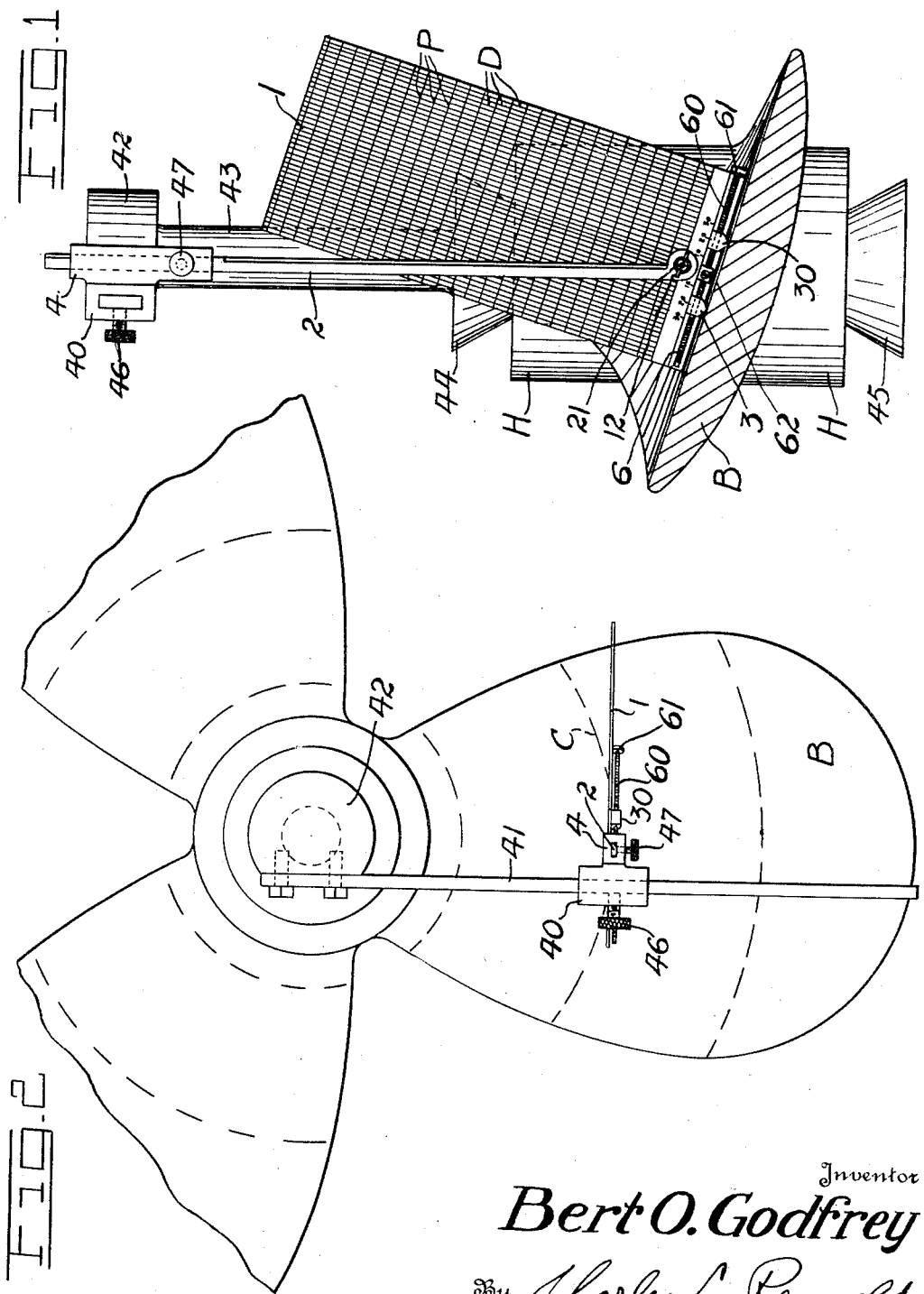

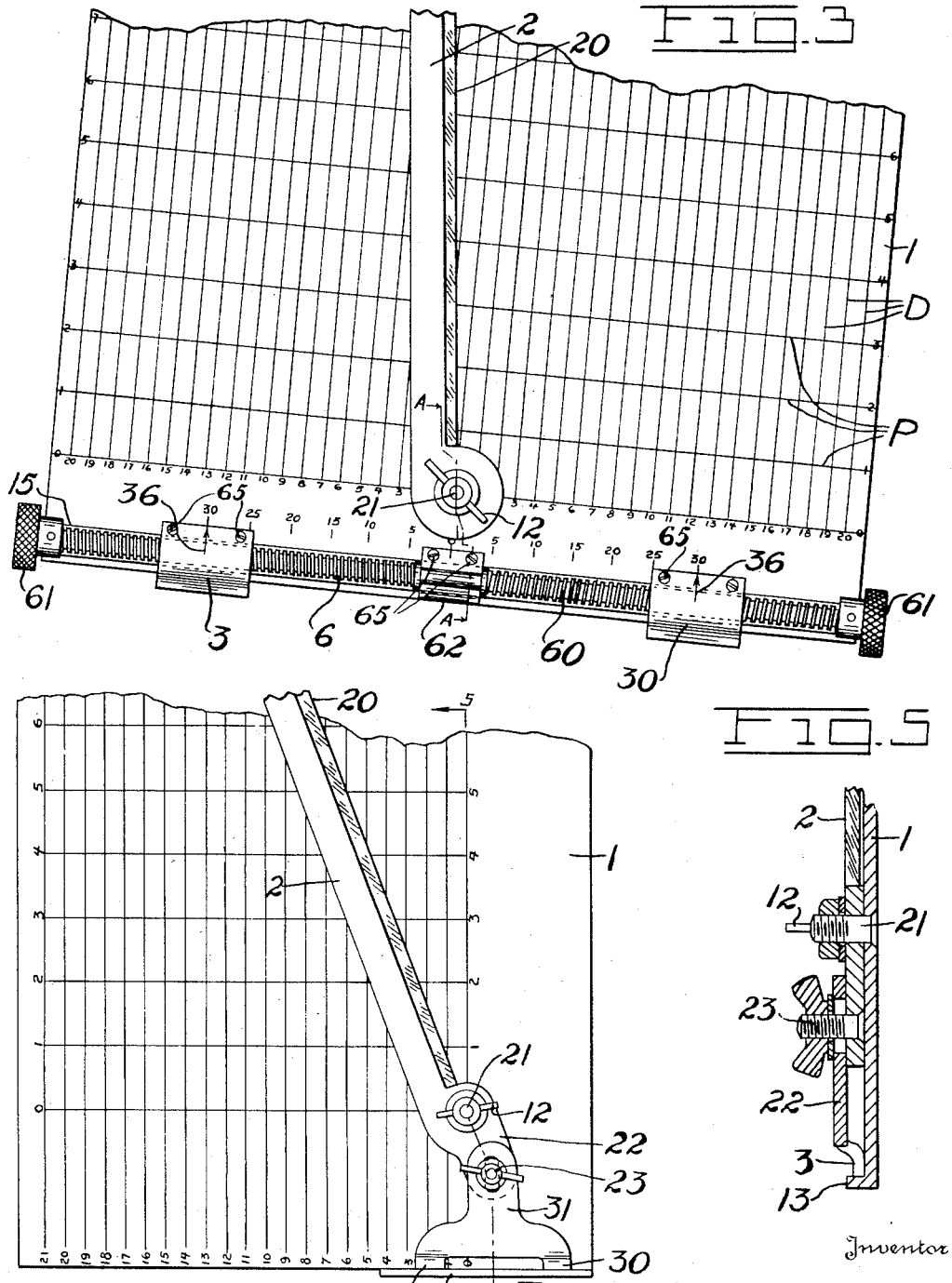

1,943,862

UNITED STATES PATENT OFFICE 1,943,862

DIRECT-READING PITCHOMETER

Bert O. Godfrey, Brooklyn, N. Y.

Application March 13, 1931. Serial No. 522,217

12 Claims. (Cl. 33—174)

My invention relates to an improvement in instruments for measuring the pitch of propellers, either the pitch distance or the pitch angle, from certain known factors, the diameter being in all cases known, and either the pitch angle being known, from which to determine the pitch distance, or the reverse. My invention also relates to a method whereby more accurate measurements of pitch angle or pitch distance may be made during the course of making a plurality of measurements.

Heretofore, in measuring pitch angles or pitch distances, it has been necessary to determine a known quantity, for instance, the pitch angle, the pitch distance being then the unknown quantity to be determined, and then, by reference to a chart, with the diameter at which the measurement was taken indicated, it was possible to determine the unknown quantity. This, however, involved the memorizing of a chart of angles and distances, coupled with diameters, or the reference to such a chart following each determination. It is my object, with the present invention, to provide a means whereby there can be read upon the tool or instrument itself the precise distance or angle, whichever is to be determined, merely upon application of the tool to the work at a known diameter, thus eliminating all necessity for reference to charts.

Associated with this general object, it is also my object to provide instruments for use in such determinations which are adaptable to various classes of work, from pocket implements to heavy shop implements, through instruments which may be employed in association with devices for aligning them with the axis of the propeller being measured.

My invention comprises the novel instrument and the novel method as illustrated in the drawings, described in this specification and as will be more particularly pointed out by the claims which terminate the same.

In the accompanying drawings I have shown my invention embodied in various types of instruments as indicated above.

Figure 1 is a side elevation of an intermediate form of my instrument, showing the same associated with a self-centering support and right-angle bar, and Figure 2 is a plan view of the same.

Figure 3 is an enlarged view of the same instrument.

Figure 3A is a section on line A—A of Figure 3.

Figure 4 is an elevation, and Figure 5 is a section on the line 5—5 of Figure 4, showing a modified form of my device.

Figure 6 is an elevation, and Figure 7 is a section on the line 7—7 of Figure 6, illustrating a further modified embodiment of my invention, showing a simple or pocket form thereof.

Figure 8 is an elevation, and Figure 9 a section on the line 9—9 of Figure 8, showing a further modified form intended for heavy duty use within a shop.

The geometrical principle involved in this instrument is based upon the knowledge that the circumference of a circle is $\pi$, or 3.14 times its diameter. Now, for any diameter, a given point will move, when the propeller is rotated 1/3.14 of its circumference without advancing, through an arc equal in length to the diameter of the circle including such point. If the propeller is permitted to climb, or advance, however, this same point will move through a greater distance—a distance which is the hypotenuse of a right-angled triangle having for its base the diameter of the circle including the selected point (or more exactly, the distance it moves if there is no advance), and having as an angle (the angle between the base and the hypotenuse) the pitch angle at the selected diameter. But the point has not completed a revolution as yet, but only 1/3.14 of a revolution. Nevertheless, if we construct the triangle with this base line and this hypotenuse, with the known pitch angle, we arrive at an altitude 1/3.14 of the pitch distance. Multiply both the diameter and the altitude by $\pi$, and we have not changed the pitch angle or the relationship of the sides of the triangle, hence we may revert back to the original triangle, and represent the pitch distance by the altitude, and the circumference by the diameter, each 1/3.14 of the true value. This condenses the spacing of the lines, and gives us a relationship between the spacing of diameter lines and the spacing of pitch distance lines. The spacing of the diameter lines is seen to be $\pi$ times the spacing of the pitch distance lines, so that the true propeller pitch will be directly readable from the chart, for various diameters.

Now if we know the diameter and the pitch angle, we can find the pitch distance by reconstructing the triangle and observing where the diameter line intersects the hypotenuse, and the element representing the hypotenue may, of course, be movable relative to the elements representing the diameter and pitch distance, which latter may be lines upon a plate. If the diameter and pitch distance are known—which is the usual case—the pitch angle can be determined by constructing the triangle with the movable hypotenuse at the intersection of these known diameter and pitch distance lines. This pitch angle will vary at different diameters of the same propeller, but the pitch distance, the amount of theoretical advance for each revolution, is the same for all diameters of a given true pitch propeller.

Accordingly, to reconstruct the triangle visually, I provide a plate, generally designated by the numeral 1, which may take various forms and be used in various ways, and lay out upon the surface of this plate two series of lines crossing each other at right angles, one series, the lines D, represent diameters, or 1/3.14 of the circumference; the other series, the lines P, represent 1/3.14 of the pitch distances, though they are designated as the full pitch distance. The relationship of the spacing of the lines D to the spacing of the lines P is as unity to $\pi$.

Pivoted at an arbitrarily selected zero intersection between two lines, one in each series, is a reading arm 2. The pivot, as shown in Figure 1, is at the point 21 and may take the form of a pin or bolt permanently or temporarily secured in the plate, and the arm may, if desired, be removably secured upon this pivot pin, as for instance, by means of the wing nut 12. From this zero point the lines are marked into selected units or numbers, as may be best seen in Figure 3.

The instrument thus far described will serve for the measurement of pitch distances or pitch angles by the suitable application thereto of an instrument which has its angle determined by alignment with the axis of a propeller on the one hand, and by contact of two spaced trammel points with the surface of the propeller blade on the other hand, as shown in Figures 8 and 9, but I have found it convenient in some cases to employ the instrument itself for such measurements, and to that end, I provide upon one edge of the instrument, adjacent to the zero point at 21, a pair of contact members 3 and 30; see Figures 1, 2 and 3. For greatest accuracy these should be equally spaced at opposite sides of the zero point, and their function is to contact with the face of the propeller blade B, along circles of known diameter, and thus, with the reading arm 2 held in fixed relationship to a plane normal to the axis of the propeller, for example, being held in parallelism with the propeller's axis, and with the two contact points 3 and 30 in contact with the surface of the blade B along the circumference of the circle of selected diameter, the arm 2 and plate 1 and the lines on the latter will assume a definite angular relationship which is peculiar to that particular pitch angle.

Let us assume that the diameter is 7 inches, and that the pitch distance is 2 inches, the angle assumed by the arm 2 relative to the lines D upon the plate 1 will be that shown in Figure 3, and since the diameter is known, it is only necessary to follow along that line D which represents 7, and to observe where the reading arm 2 crosses that line, and we have ascertained the pitch distance to be 2. Or, if the pitch distance, and of course the diameter is known, and we desire to know what angle the propeller blade should have to be correct for the selected diameter and pitch distances, we can set the reading arm 2 at the intersection of the diameter 7 and pitch distance 2, and that angle is as shown in Figure 3. Further, if the numbers do not run high enough, we may merely multiply by 2 or 3 or more, as the case may be. The selected setting, shown in Figure 3, is the same for a diameter of 14 and a pitch distance of 4, whatever units these may be measured in.

Various means may be employed, as shown by way of illustration in Figures 1 and 2, for supporting the instrument in proper position relative to the axis of the propeller. As an example, the reading bar 2 is shown as received in its upper end in a sleeve 4 of a slide having a second sleeve 40 at right angles to the sleeve 4, this sleeve 40 receiving a supporting arm 41, which is secured upon the upper end 42 of a rotatable post 43 which is held coaxial with the hub H of the propeller by such means as the two cones 44 and 45. By means of the set screw 46, the sleeve 40 may be set to cause the contact points 3 and 30 to contact along any selected circle C inscribed or measured upon the blades B of the propeller, and the reading arm 2 may be moved up and down in its sleeve 4 or held in any selected position by the clamping screw 47.

A simpler form of the device is shown in Figure 6, which illustrates a small instrument for pocket use. The reading arm 2 may be aligned in any suitable fashion, as for instance, visually, with a rod maintained in the axis of the propeller, and the contact points 3 and 30 are secured upon, or form a part of, the lower edge of the plate 1.

In all of these forms it will be observed that the reading edge 20 of the reading arm 2 lies in a radius through the pivot point 21.

In Figures 4 and 5, there is shown an instrument which employs a plate 1, the pivot point 21, however, being toward one side of the board. The reading arm 2 is provided with an extension 22 beyond the pivot point 21, and upon this extension 22 is secured a foot piece 31, on which are formed the contact points 3 and 30. The angular position of these is fixed by contact with a ledge 13 along one side of the plate 1, parallel to the lines P, with which ledge these contact points 3 and 30 may contact, and the foot piece 31 is secured to the extension 22 by a pin and slot connection and the clamp nut, indicated in general at 23. With this instrument, the angle is determined by setting the reading arm 2 at the known pitch distance and diameter, and then the clamping nut at 23 is clamped down, with the two contact points 3 and 30 in contact with the ledge 13. The arm 2 is now removed from the plate by removing the wing nut 12, and is applied to the propeller blade, the arm 2 being aligned with the axis of the propeller visually by means of the support illustrated in Figures 1 and 2, or by any other suitable means.

In Figures 8 and 9, a further extension of this idea is shown, in a heavy duty shop instrument. The reading arm 2 is not intended to be removed from the plate 1, although it can be if necessary. However, a separate instrument, comprising an arm 29 and a foot piece 33 pivoted thereon at 34 carries the contact points 3 and 30. The plate 1 is provided with a groove at 14 to receive the sight rod 29, or some like means are provided to fix its angle definitely in parallelism with the lines P. A spring 5 may be employed bearing against a pin 25 upon the sight rod 29, tending to press the points 3 and 30 against the back edge of the arm 2, and it may be clamped in any selected position by a clamping jaw 28 and wing nut 27.

In the use of this instrument, the plate 1, which may be permanently secured on the top of a bench, has the arm 2 pivoted to it, and the arm is swung over the plate to a selected setting for pitch and diameter, for instance, for a diameter of 5 and a pitch of 7, as illustrated in Figure 8.

The small tool, consisting of the footing piece 33 and the sight rod 29, is now applied, the rod 29 being held in its groove so as to be kept parallel with the lines P, and the contact points 3 and 30 contact with the arm 2 at the selected setting, and the footing piece 33 is pivoted about its point 34, until it assumes the same angular position with relation to the arm 29 that has been assumed by the arm 2 relative to the lines P of the plate 1. Now, the small instrument may be removed from the plate, and this smaller instrument may be applied to the propeller, the sight rod 29 being suitably aligned as before with the axis of the propeller, and the contact points 3 and 30 contacting along the circle of the selected diameter inscribed upon the surface of the propeller blade.

It will be understood that contact points spaced a given distance will subtend a chord on a circle of small diameter equal to an appreciable part of the entire circumference of that chord. On the other hand, on a circle of considerably larger diameter, contact points at the same spacing will subtend but a small chord and will closely approximate the circumference of that chord. This will disturb the accuracy of measurement, and such measurements, to be exact, should be across chords which are equiangular. To obtain this result, therefore, I prefer that the contact points 3 and 30 be adjustable relative to each other, and relative to the pivot point 21.

Moreover, if the contact points are not equally spaced at opposite sides of an extension of the reading edge 20, and if the reading arm 2 (or its equivalent, the sight rod 29) is held in a vertical position, the edge 20 in an axial plane (as in the device of my Patent No. 1,547,380, dated July 28, 1925), the contact points will contact with the propeller blade along a line approaching a tangent, rather than a chord. This is true because the governing line, the reading edge 20, lies closer to one point (30, for instance) than to the other point. If this nearer point is placed upon the inscribed circle on the blade, the farther point will lie outside the circle, and to this extent accuracy will be destroyed. The error thus introduced is greatest when the pitch angle is the steepest, and its primary cause is the necessity for offsetting the pivot 21 from the line of contact of the points 3 and 30. To correct this error, it is desirable that the two points 3 and 30 be complementally shifted laterally to maintain them, whatever may be their spacing from each other, equidistant from an extension of the reading edge 20.

These adjustments may be accomplished in various ways. As shown, each of these contact points is suitably guided, as upon a T-guide 15, upstanding from the plate 1, and is threaded to receive, the one a right-hand threaded screw 6, and the other a left-hand threaded screw 60, the two screws being formed on opposite ends of a single shaft rotatable by means of the handles 61. This shaft may be centrally supported from the plate 1 in the plain bearing 62, which is similarly guided upon the guide 15.

To hold any one or all of the sliding members 3, 30, and 62 in adjusted position, the clamping screws 65 (see Figure 3A) are screwed in to grip the guide 15 with the gib 66. Upon slacking off the screws 65 of the contact point 3 and the bearing 62, for instance, leaving the contact point 30 clamped in position, rotation of the screw 60, 6 can advance the bearing 62 and the point 3, to the left, as seen in Figure 3, the latter twice as rapidly as the former, and the points 3 and 30 may be brought into position equidistant from the extension of reading edge 20. The bearing 62 may be clamped in position, and the two contact points may be adjusted, always keeping equal distances from the bearing. The screws 6 and 60 would be long enough to permit such adjustments.

An index mark 36 may be placed upon each of the contact points, cooperating with a scale on the plate 1, or adjustable with the bearing 62, and thus the spacing of the contact points may be set at a small value to correspond to readings upon a circle of small diameter, or they may be more widely spaced to correspond to circles of larger diameter, and the operator knows that the measurements will all subtend a chord of equal angle on all circles, that the approximation to the true circumference of the circle at the two points will be alike in all of the circles of measurements, and that the contact points always lie substantially upon the circle.

While I have shown the adjustable contact members and bearing 62 only in association with the form of Figures 1, 2 and 3, it will be understood that they may be incorporated in any of the other forms, and preferably would be where simplicity of construction and lightness is not a controlling factor.

What I claim as my invention is:—

1. A means for determining propeller pitch comprising a plate ruled with two series of cross lines, the spacing of the lines of one series bearing the relationship to the spacing of the lines of the other that the circumference of a circle bears to its diameter, a zero point established at the intersection of two lines, one being selected from each of said series, an arm pivoted at the zero point and movable over the plate, and contact members supporting said plate, the angular position of which with relation to a base plane perpendicular to the propeller axis is determined by the disposition of the arm relative to the cross lines, said contact members being adapted for contact with a propeller blade and the arm being adapted to be simultaneously aligned with the axis of the propeller whereby the pitch thereof may be determined.

2. A means for determining propeller pitch comprising a plate ruled with two series of lines crossing at right angles, the spacing of the lines of one, a diameter series, bearing the relationship to the lines of the other, or pitch distance series, that 1 bears to $\pi$, a zero point established at the intersection of two lines, one being selected from each of said series, an arm pivoted at the zero point and movable over the plate, a sight rod, and a pair of trammel points pivoted on said sight rod, means upon the plate for holding the sight rod in position parallel to the pitch distance lines, with the trammel points bearing upon the said arm.

3. A means for determining propeller pitch comprising a plate ruled with two series of lines crossing at right angles, the spacing of the lines of one, a diameter series, bearing the relationship to the lines of the other, or pitch distance, series, that 1 bears to $\pi$, a zero point established at the intersection of two lines, one being selected from each of said series, an arm pivoted at the zero point and movable over the plate, a sight rod and a pair of trammel points pivoted thereon, means upon the plate for holding the sight rod in position parallel to the pitch distance lines, with the trammel points bearing upon the said arm, and spring means to press the trammel points against said arm.

4. A means for determining the pitch of propeller blades including a member adapted for alignment with the propeller axis, and a second member pivoted thereupon for angular adjustment relative thereto, two contact points disposed at opposite sides of the pivot and slidable along that edge of the second member which is adapted to be placed adjacent the propeller blade, a right and left screw journaled in the second member and threaded in the respective contact points, and a scale associated with the contact points and graduated to enable the points to intercept equiangular chords on circles of different diameters.

5. A means for determining the pitch of propeller blades including an arm adapted for alignment with the propeller axis, a base pivoted thereon for angular adjustment relative to the arm, two contact points disposed at opposite sides of an extension of the arm through the pivot, and slidable transversely of such extension along that edge of said base which is adapted to be placed adjacent the propeller blade, a bearing disposed half-way between the contact points and likewise slidable transversely, a right and left screw journaled in the respective contact points, and rotative in said bearing, and means to secure any selected one of the contact points and bearing fixed relative to the base, whereby the others may slide under the influence of the screw.

6. A means for determining propeller pitch or pitch angle comprising a plate ruled with two series of parallel straight lines crossing at right angles, the spacing of the lines of one series, representing diameters, bearing the relationship to the spacing of the lines of the other series, representing pitch distances, that 1 bears to $\pi$, a zero point established at the intersection of two lines adjacent one edge of the plate, one being selected from each of said series, a reading arm pivoted at the designated zero intersection, and having an edge extending in a radius from such zero point, and a pair of contact points projecting from the edge of said plate adjacent the zero point, and equally spaced at opposite sides of such point.

7. A means for determining propeller pitch or pitch angle comprising a plate ruled with two series of lines crossing at right angles, the spacing of the lines of one series, representing diameters, bearing the relationship to the spacing of the lines of the other series, representing pitch distances, that 1 bears to $\pi$, a zero point established at the intersection of two lines, adjacent one edge of the plate, one being selected from each of said series, a reading arm pivoted at the designated zero intersection, and having an edge extending in a radius from such zero point, a pair of contact points projecting from the edge of said plate adjacent the zero point, and equally spaced at opposite sides of such point, and means for varying the spacing of the contact points from each other to subtend equiangular chords for each diameter upon which measurements are to be made.

8. A device for determining propeller pitch comprising a gauging pair including a sighting member adapted for alignment with the propeller axis, and a contact member pivotally mounted thereon and adapted for contact with a propeller blade at the same time said sighting member is aligned with the propeller axis, the angle between said members corresponding to the propeller pitch at the given diameter at which the reading is taken, and a reference plate ruled with two series of cross lines, the spacing of the lines of one series, representing propeller pitch, bearing the relationship to the spacing of the lines of the other series, representing propeller diameter, that the circumference of a circle bears to its diameter, said gauging pair being mounted on said plate with one member parallel to the series of lines representing propeller pitch, and the other member bearing an angular relation to such series of lines representing propeller pitch, to indicate the propeller pitch for the given diameter at the diameter line on said plate corresponding to the propeller diameter at which the reading was taken.

9. The combination of claim 8, the contact member comprising spaced contact points, and means to adjust the spacing between the contact points in direct proportion to the propeller diameter at which the reading was taken.

10. A device for determining the pitch of propeller blades comprising means including a member adapted for alignment with the propeller axis, and a second member pivoted thereupon for angular adjustment relative thereto, two adjustable contact points upon the second member, such pivot being located without a line joining the contact points, and means to adjust the contact points transversely of said alignment member to position them at equal distances from and at opposite sides thereof.

11. A device for determining propeller pitch or pitch angle comprising means including a plate ruled with two series of lines crossing at right angles, the spacing of the lines of one series, representing diameters, bearing the relationship to the spacing of the lines of the other series, representing pitch distances, that 1 bears to $\pi$, a zero point established at the intersection of two lines, one being selected from each of said series, a reading arm pivoted at the designated zero intersection, adjacent one edge of the plate, and having an edge extending in a radius from such zero point, a pair of adjustable contact points projecting from the edge of said plate adjacent the zero point, and means to shift said contact points transversely of the reading edge, to maintain them equidistant from an extension of said reading edge, for all operative positions thereof.

12. A means for determining propeller pitch comprising sighting means adapted for alignment parallel to a propeller axis, contact means pivotally connected thereto and adapted for contact with a propeller blade, and a plate bearing a fixed relation to one of said means, and ruled with two series of cross lines, the spacing of the lines of one series bearing the relationship to the spacing of the lines of the other series that the circumference of a circle bears to its diameter, whereby the pitch of the propeller blade corresponding to the relative angular displacement of said two means is indicated at the intersection of a line defined by the other means with that diameter line on said plate corresponding to the diameter on the propeller at which the reading is taken.

BERT O. GODFREY.